United States Patent [19]

LeRoy

[11] 4,294,274

[45] Oct. 13, 1981

[54] HYDROGEN INJECTION INTO GAS PIPELINES AND OTHER PRESSURIZED CONTAINERS

[75] Inventor: Rodney L. LeRoy, Pointe Claire, Canada

[73] Assignees: Noranda Mines Limited; The Electrolyser Corporation Ltd., both of Toronto, Canada

[21] Appl. No.: 58,306

[22] Filed: Jul. 17, 1979

[30] Foreign Application Priority Data

Jul. 17, 1978 [GB] United Kingdom ............... 30090/78

[51] Int. Cl.³ .............................................. F17D 1/02
[52] U.S. Cl. ......................................... 137/7; 137/154
[58] Field of Search ...................... 206/0.7; 220/88 R; 55/523, 74; 137/604, 602, 1, 154, 7, 171

[56] References Cited

U.S. PATENT DOCUMENTS 3,406,496 10/1968 Betteridge .......................... 55/74 X
4,183,369 1/1980 Thomas ........................... 206/0.7 X

*Primary Examiner*—Alan Cohan
*Attorney, Agent, or Firm*—Fleit & Jacobson

[57] ABSTRACT

A method of introducing hydrogen into a gas pipeline or other pressurized gas containers is disclosed. The method comprises feeding hydrogen from a low pressure source into the gas container through a barrier which is freely permeable to hydrogen but impermeable to the gas in the container until the hydrogen partial pressure in the container becomes equal to the hydrogen pressure which is applied to the barrier.

8 Claims, 5 Drawing Figures

HYDROGEN INJECTION INTO GAS PIPELINES AND OTHER PRESSURIZED CONTAINERS

This invention relates to hydrogen injection into gas pipelines and other pressurized vessels.

In many processes for the production of hydrogen, in particular in processes for hydrogen production by the electrolysis of water, hydrogen gas is produced at or near atmospheric pressure. In the production of hydrogen by water electrolysis, equipment is also available which can produce hydrogen at 20 atmospheres pressure or higher. However, such equipment is of inherently high capital cost per unit of electrode area compared to atmospheric pressure electrolysers because of the stringent requirements for controlling pressure balance between the anode and cathode compartments of each cell, and the difficulties of sealing the apparatus with suitable insulating materials to prevent escape of contained gases and electrolyte.

Hydrogen is required at high pressures in many chemical applications, for example the manufacture of ammonia, and in potential energy applications which are being considered such as supplementation of pipeline natural gas by injection of hydrogen to levels as high as 10% by volume or more. For such applications, hydrogen production in pressurized water electrolysers rather than atmospheric pressure water electrolysers is often considered desirable despite its high capital cost because of the high cost of pressurizing the gas from atmospheric pressure to 500-1000 psig or more. Based on estimates published by the Institute of Gas Technology in 1977, the cost of hydrogen compression from atmospheric pressure to 500 psig is approximately $0.15 per 1000 standard cubic feet, or $0.47 per million BTU's on an energy equivalence basis. This estimate is based on recovery of 18% per year of the installed compressor cost to cover capital charges plus 10% per year for operation and maintenance, with electric power for operation of the compressor being valued at 15 mill/KWH. Thus, the compression cost is a large proportion of the energy value of the hydrogen. For comparison, the average Canadian export price for natural gas in 1977 was approximately $2.00 per million BTU's.

Methods have been proposed for hydrogen compression at a reduced cost, using metal hydrides. Certain alloys such as Lanthanum-Nickel and Iron-Titanium have been proved to accept hydrogen by reactions forming metal hydrides, at a pressure and temperature which is characteristic of the particular alloy. Most such materials require an elevated pressure to cause them to take up hydrogen at a significant rate at normal room temperatures, although recently a range of ternary alloys has been developed which are capable of taking up hydrogen at atmospheric pressure and room temperature. Compression is accomplished by heating the hydride-containing vessel so that hydrogen is in equilibrium with the hydride at a substantially higher pressure. The degree of compression achievable in a single stage depends on the range of temperatures available for charging and discharging and on the particular hydride-forming material being used. For a charging temperature of 5°-50° C. and a discharging temperature of 30°-150° C. compression might be by a factor of 3 to 10 times. Thus, many stages of hydride compression would be required to effect hydrogen compression from one atmosphere to, for example, pipeline pressures of 800 to 1200 psig.

In many important applications, hydrogen constitutes a relatively small proportion of the gas in the end-use atmosphere. An example is hydrogen injection into gas pipelines to a proportion of initially much less than 1% by volume, rising eventually to 10% or more. If the pipeline pressure were 1000 psig, this would require a hydrogen partial pressure in the pipeline of initially much less than 10 psig, and eventually 100 psig or more. However, the prior method of hydrogen injection to these levels would be to compress the hydrogen gas to 1000 psig or more and admit it to the pipeline by means of a valve.

It is, therefore, the object of the present invention to provide a method of introducing hydrogen into high pressure gas mixtures, which does not require compression of the hydrogen to the total mixture pressure before injection.

The method, in accordance with the invention, comprises feeding hydrogen into a gas pipeline or other pressurized gas container through a barrier freely permeable to hydrogen but impermeable to the gas in the container until the hydrogen partial pressure in the container becomes equal to the hydrogen pressure which is applied to the barrier.

Such a hydrogen permeable barrier could be manufactured from palladium or a palladium-silver alloy. However, in accordance with a preferred embodiment of the invention, pressure vessels containing hydride-forming metal alloys are used as hydrogen permeable barriers.

The invention will now be disclosed, by way of example, with reference to the accompanying drawings in which.

Before proceeding with the description of the preferred embodiment of the invention, let us consider a barrier freely permeable only to hydrogen which is attached onto a branch pipe leading into a pipeline carrying natural gas. If hydrogen were supplied to this barrier at a pressure of, say, 20 psig, it would pass freely through the barrier until the hydrogen concentration in the pipeline had built up to the point where its chemical activity was exactly equal to the chemical activity of pure hydrogen at 20 psig. This would correspond to a hydrogen partial pressure in the pipeline of approximately 20 psig. If the pipeline pressure were 1000 psig, the resulting hydrogen concentration in the pipeline would be approximately $(20+14.7)/(1000+14.7) \times 100 = 3.4\%$. Thus, injection of 3.4% of hydrogen could be achieved using hydrogen which had been compressed to a pressure of only about 2.4 atmospheres. This compares with compression to in excess of 70 atmospheres required in the prior art.

Figure 1:
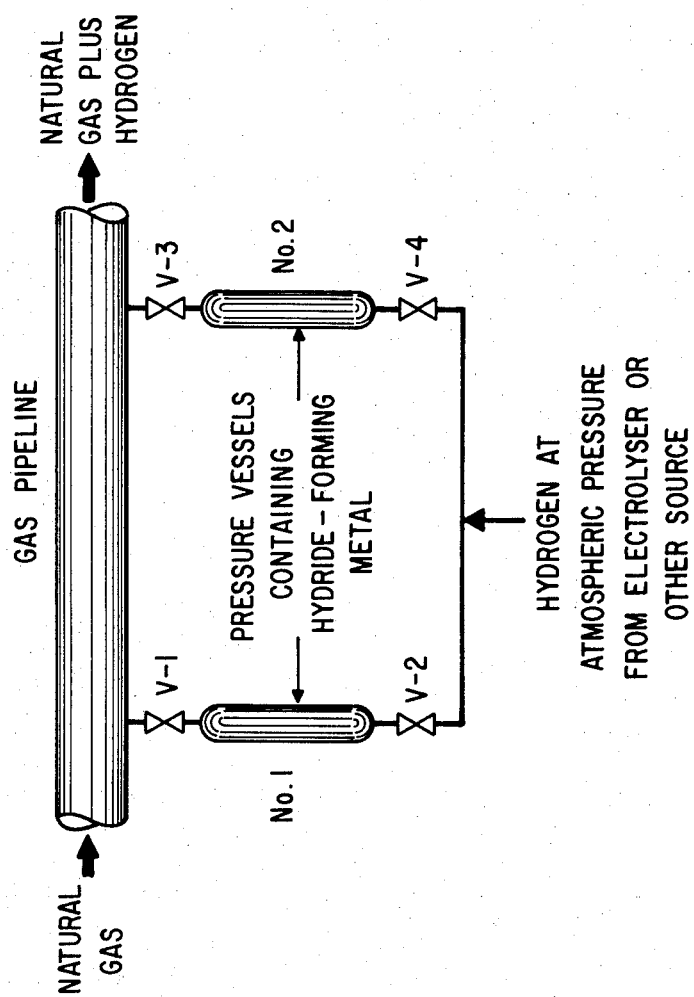
FIGS. 1 and 2 illustrate schematic representations of typical embodiments of the invention.

A suitable hydrogen diffusion barrier for practising the present invention could be manufactured from palladium or a palladium-silver alloy. However, such barriers are expensive and their hydrogen-passing ability tends to degrade with time. Therefore, applicant prefers to utilize pressure vessels containing hydride-forming metal alloys as an effective hydrogen permeable barrier. This embodiment is based on the fact that it is the partial pressure of hydrogen which is determined by the temperature of a metal hydride, not the total pressure. Thus, a suitable hydride could discharge hydrogen at 20 psig, whether or not a "background" of 1000 psig of natural gas were present. A typical example is represented schematically in FIG. 1. Pressure vessels No. 1 and No. 2 containing the hydride-forming metals are attached to a gas pipeline through valves V1 and V3, respectively. With the valve V1 closed, hydrogen at atmospheric pressure or above is charged into the pressure vessel No. 1 at a low temperature $T_1$, for example, 5°–50° C. At this time, valve V4 is closed, valve V3 is open and pressure vessel No. 2 is discharging hydrogen into the pipeline at a higher temperature $T_2$, say 30°–150° C. (assuming that it had been previously charged). At the end of the charging cycle on vessel No. 1 and discharging cycle on vessel No. 2, the process is reversed. Valves V2 and V3 are closed, vessel No. 1 raised to a temperature $T_2$ and vessel No. 2 lowered to temperature $T_1$. Valves V1 and V4 are then opened so that vessel No. 2 is charged with hydrogen and vessel No. 1 is discharging hydrogen into the pipeline. It is to be understood that a single pressure vessel could be used but it is economically preferable to use two pressure vessels operated on a time shared basis.

Of course, many variants of this physical arrangement can be envisaged within the scope of this invention, for example, with three, four or more pressure vessels containing hydride-forming metals. A wide variety of manifolding, valving and sequencing arrangements could be used but also it would be desirable to make provision for evacuation of gas from the pressure vessels when the valves V1 and V2, or V3 and V4, are closed at the end of a discharging cycle, in order to prevent flow into the hydrogen feedline on opening of valves V2 or V4. This gas could be vented, flared or compressed for re-injection into the pipeline.

Figure 2:
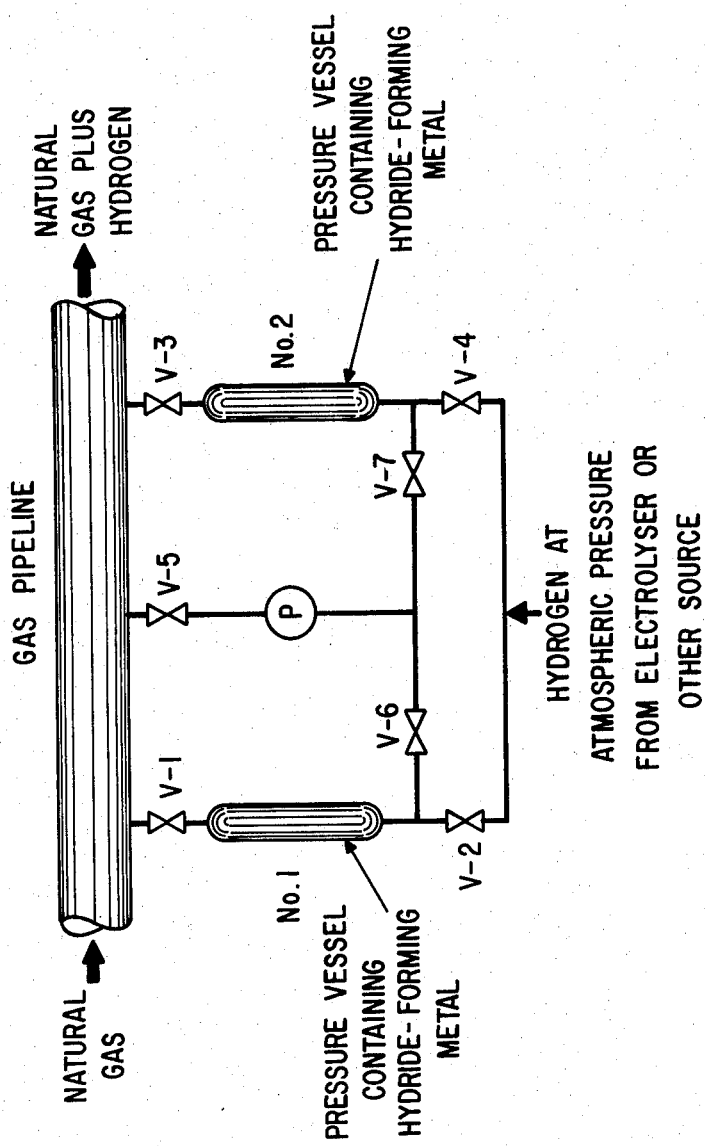

It may also be desirable during discharge of the hydride-containing vessel into the pipeline to circulate a low volume of natural gas from the pipeline through the vessel to avoid diffusion limitations on the rate at which the envolved hydrogen can pass onto the main line. As shown in FIG. 2, this may be evenly done by a pump P and suitable valves V5, V6 and V7.

It is also known that hydride-forming alloys may be effectively used for purification of the stored hydrogen. Thus, hydrogen sources containing significant amounts of impurities, such as carbon monoxide and other carbon containing compounds, could be purified while being fed into the pipeline or pressurized gas container.

The workability of this invention depends on the ability of a metal hydride to desorb a large proportion of its contained hydrogen against a pressure of natural gas. Typical natural gas compositions are 96.5% methane, 2.4% ethane, 0.2% propane, 0.02% butane, 0.1% nitrogen, and 0.8% carbon dioxide. Typical pressures are around 1000 psig. The feasibility of hydrogen injection into such a gas stream through a metal hydride bed is demonstrated by the following examples.

EXAMPLE 1

A 500 ml hydride vessel was used, constructed from 316 stainless steel, and pressure rated to 1800 psig. Temperature control was achieved with coiled 0.25-in copper tubing around this vessel, through which hot and cold water could be passed. Additional heating could be achieved using a 0.5-in×24-in strip of fiberglass-insulated heating tape. Internal temperatures in the hydride reservoir were measured with an iron-constantan thermocouple which was mounted on a 12-in probe.

Composition of gas mixtures obtained was determined through calculations based on measured pairs of temperature and pressure values. Calculated ratios were confirmed in several cases by gas chromotograph measurements.

In the experiments of this example, the hydride vessel was loaded with 321 grams of an alloy having the composition $Fe_{0.87}Mn_{0.10}Ti$. The alloy was crushed to $-30$ mesh prior to loading. It was activated by evacuation to 10 microns for several hours, using a mechanical vacuum pump. The reservoir was then pressurized with 68 atmospheres of hydrogen for approximately 50 hours.

Figure 3:
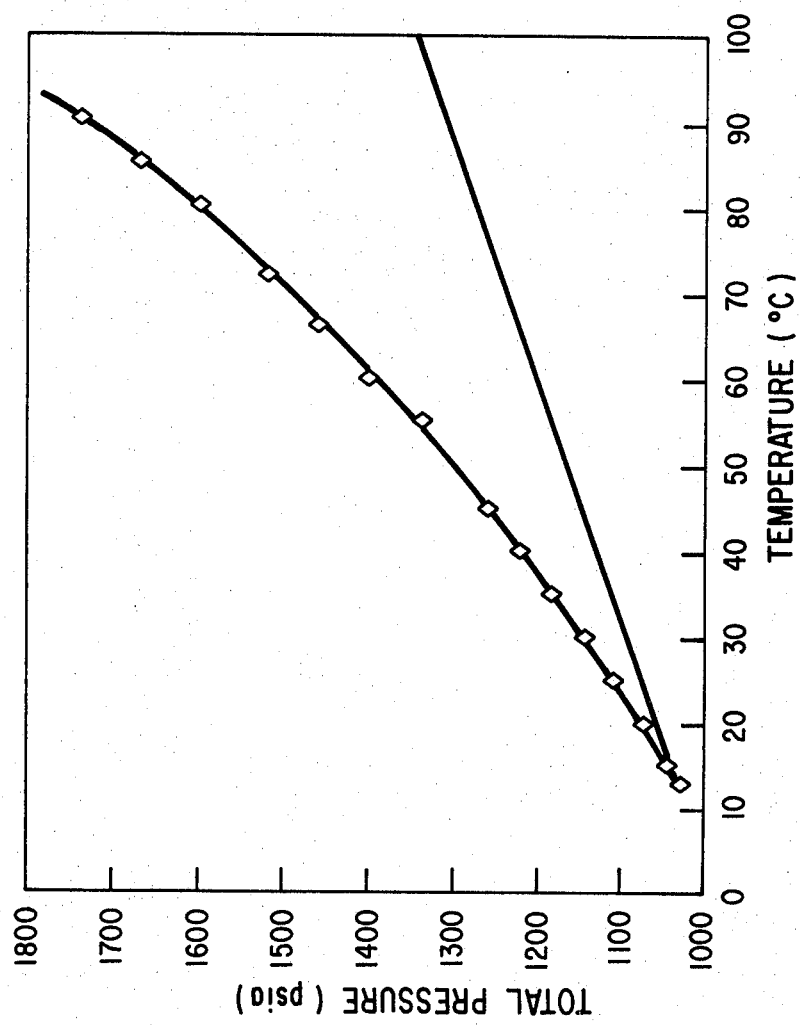
FIG. 3 shows the increase in total pressure of methane and hydrogen with increasing temperature of an iron-titanium-manganese hydride bed.

A typical experimental result is recorded in FIG. 3. In this example, the hydride was charged with hydrogen at 56 psia, at a temperature of 13° C. A pressure of 977 psia methane was admitted to the vessel, the vessel was isolated, and heating was initiated. The measured points show an increase in total pressure with increasing temperature of the hydride bed. The solid line indicates the pressure increase which would have resulted from heating of the 1,033 psia of gas which was initially present. The quantity of hydrogen desorbed, measured in psia at the initial hydride temperature $T_o$, was calculated from the experimental results using the expression $$\text{Hydrogen Desorbed} = P_f \times T_o/T_f - P_o$$

where $P_f$ and $P_o$ are final and initial pressures respectively, and $T_f$ and $T_o$ are similarly the final and initial temperatures in degrees Kelvin. Analysis of the data of FIG. 3 in this way showed a calculated percentage of hydrogen of 29.2% at the final temperature of 93° C. Gas-chromotographic analysis of the final mixture confirmed this result, with a measured hydrogen proportion of 27.3%.

Figure 4:
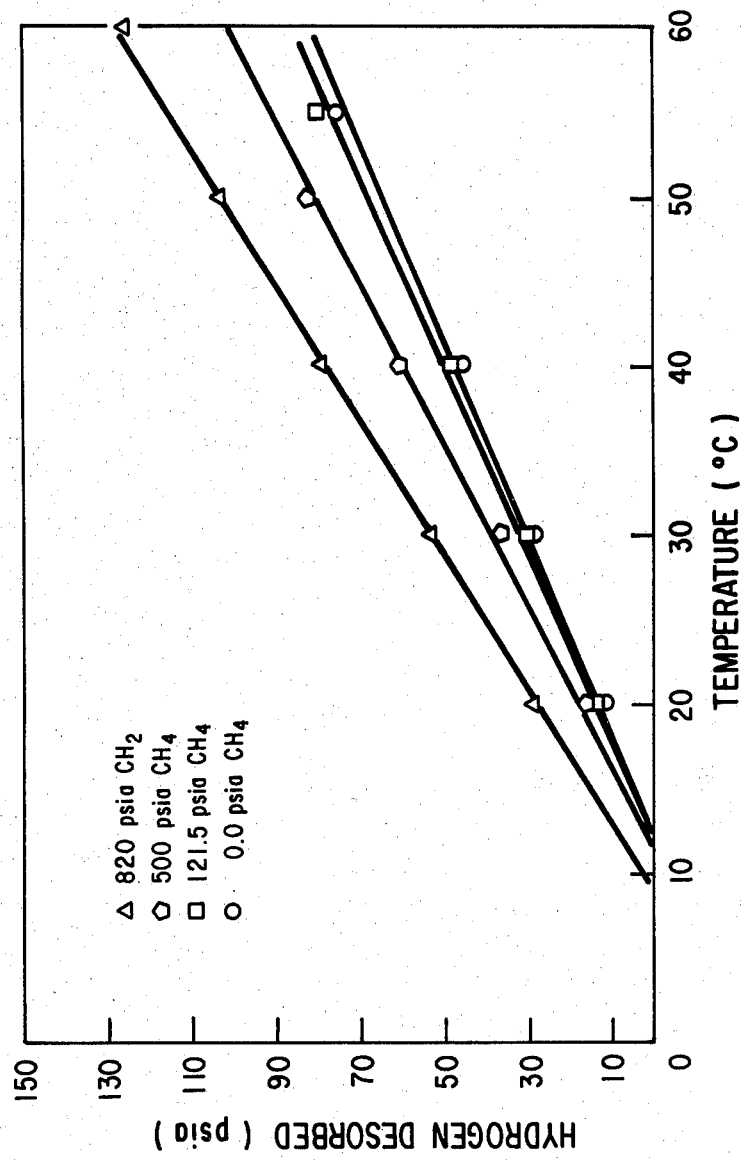
FIG. 4 shows typical quantities of hydrogen desorbed as a function of temperature of the iron-titanium-manganese hydride bed.

FIG. 4 presents typical quantities of hydrogen desorbed as a function of the temperature of the hydride bed, for methane back pressures of 0–820 psia. In every case, the presence of methane gas, the principal constituent of natural gas, has caused no reduction in the hydrogen desorption capability of the metal hydride.

Analyses of the gas mixtures obtained at the highest hydride-bed temperatures are recorded in the following Table I:

TABLE I

HYDROGEN-METHANE MIXTURES PRODUCED BY HYDROGEN DESORPTION FROM $Fe_{0.87} Mn_{0.10} Ti$, IN PRESENCE OF VARIOUS METHANE BACK PRESSURES

| Methane Back Pressure (psia) | Initial Hydrogen Pressure (psia) | Temperature Range (°C.) | Hydrogen Desorbed (psia) | Calculated % H$_2$ In Final Mixture | Measured (G.C.) % H$_2$ In Final Mixture |
|---|---|---|---|---|---|
| 0 | 62 | 6–61 | 95.5 | 100 | — |

TABLE I-continued
HYDROGEN-METHANE MIXTURES PRODUCED BY HYDROGEN DESORPTION FROM $Fe_{0.87}Mn_{0.10}Ti$, IN PRESENCE OF VARIOUS METHANE BACK PRESSURES

| Methane Back Pressure (psia) | Initial Hydrogen Pressure (psia) | Temperature Range (°C.) | Hydrogen Desorbed (psia) | Calculated % $H_2$ In Final Mixture | Measured (G.C.) % $H_2$ In Final Mixture |
|---|---|---|---|---|---|
| 0   | 60 | 11–100 | 340.5 | 100  | —    |
| 500 | 80 | 12–62  | 102.9 | 26.8 | 28.5 |
| 820 | 75 | 6–56   | 135   | 20.4 | 20   |
| 958 | 47 | 11–53  | 146   | 16.8 | 14.3 |
| 958 | 47 | 13–53  | 142   | 16.5 | —    |
| 977 | 56 | 13–53  | 129   | 15.9 | —    |
| 977 | 56 | 13–93  | 346   | 29.2 | 27.3 |

It is clearly demonstrated that it is technically possible to achieve hydrogen concentrations in natural gas far in excess of 10%.

EXAMPLE 2

A second series of experiments demonstrating the method of this invention was carried out using a calcium pentanickel alloy. The hydride vessel was charged with 396 grams of material having the composition $Ca_{1.07}Ni_5$. Activation was carried out at room temperature with preliminary evacuation to 10 microns as in Example 1. Activation was effected with 30 atmospheres of hydrogen for 24 hours.

Figure 5:
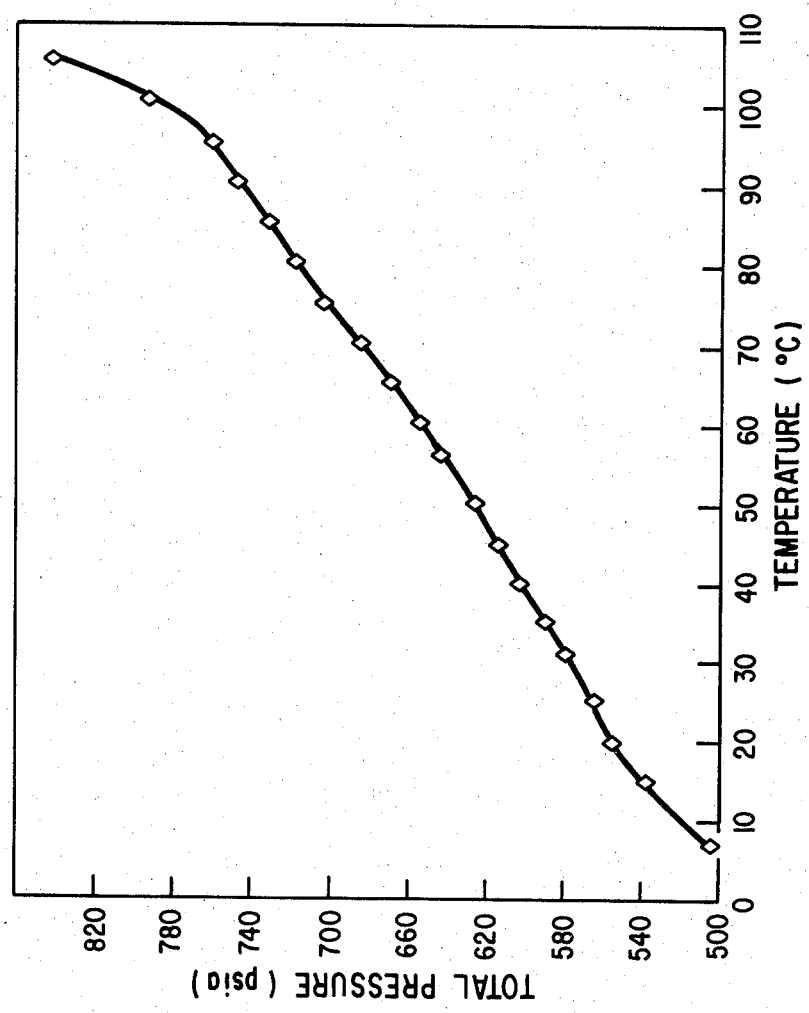
FIG. 5 shows a typical result for desorption of hydrogen from a calcium pentanickel hydride bed against a 500 psia methane back pressure.

A typical result for desorption of hydrogen from the calcium pentanickel against a 500 psia methane back pressure is illustrated in FIG. 5. Resulting mixture compositions from this example, and measurements for other back pressures and temperature ranges, are summarized in the following Table II.

TABLE II
HYDROGEN-METHANE MIXTURES PRODUCED BY HYDROGEN DESORPTION FROM $Ca\ Ni_5$, IN PRESENCE OF VARIOUS METHANE BACK PRESSURES

| Methane Back Pressure (psia) | Initial Hydrogen Pressure (psia) | Temperature Range (°C.) | Hydrogen Desorbed (psia) | Calculated % $H_2$ In Final Mixture |
|---|---|---|---|---|
| 0    | 4 | 7–60   | 26.3  | 100  |
| 0    | 4 | 7–105  | 86.4  | 100  |
| 500  | 4 | 7–60   | 46.8  | 9.2  |
| 500  | 4 | 7–105  | 106.4 | 18.1 |
| 1025 | 4 | 1–60   | 79.0  | 7.5  |
| 1025 | 4 | 7–100  | 128.8 | 11.5 |

It is evident from the results that hydrogen concentrations in excess of 10% by volume are readily produced using the calcium pentanickel alloy.

Although this invention has been disclosed in terms of hydrogen injection into a natural gas pipeline, it is by no means limited to this application. For example, ammonia is manufactured from synthesis gas which is 75% by volume hydrogen. If a pressure of 1000 psig were to be used, hydrogen could be injected to this level using gas at a pressure of only 750 psig.

The embodiments of the invention in which an exclusive property or privilege is claimed are defined as follows:

1. A method of introducing a proportion of hydrogen into a gas pipeline or other pressurized gas container, said method comprising feeding hydrogen into the container from a pressure source lower than the pressure of the gas in the container through a barrier freely permeable to hydrogen but impermeable to the gas in the container until the hydrogen partial pressure in the container becomes equal to the hydrogen pressure which is applied to the barrier.

2. A method as defined in claim 1, wherein said barrier is a pressure vessel containing a hydride-forming metal.

3. A method as defined in claim 2, wherein hydrogen is charged into a pressure vessel containing said hydride-forming metal at a low temperature of about 5°–50° C. and discharged from said pressure vessel against the back pressure of the gas in the container at a higher temperature of about 30°–150° C.

4. A method as defined in claim 3, wherein a plurality of pressure vessels are provided between the pressurized gas container and the lower pressure hydrogen source and wherein said pressure vessels are connected to the gas pipeline and the lower pressure hydrogen source through valves permitting sequential charging and discharging of said pressure vessels.

5. A method as defined in claim 3, wherein a low volume of gas from the pressurized gas container is circulated through the pressure vessel during discharge of the hydrogen gas into the pressurized gas container to avoid diffusion limitations on the rate at which the evolved hydrogen can pass into the pressurized gas container.

6. A method of introducing a proportion of hydrogen into a gas pipeline or other pressurized gas container, said method comprising:
  (a) providing a pressure source of hydrogen, the hydrogen pressure from the pressure source being lower than the pressure of the gas in the container;
  (b) providing a plurality of pressure vessels, each pressure vessel being located between and connected to the pressurized gas container and the pressure source of hydrogen, wherein each pressure vessel contains a hydride-forming metal and functions as a barrier freely permeable to hydrogen but impermeable to gas in the container, and wherein each vessel is connected to the pressurized gas container and the pressure source of hydrogen, through valves which permit sequential charging and discharging of said pressure vessels; and
  (c) feeding hydrogen into the container by sequentially charging and discharging the pressure vessels until the hydrogen partial pressure in the container becomes equal to the hydrogen pressure which is applied to the pressure vessels.

7. The method as defined in claim 6, wherein hydrogen is charged into each pressure vessel containing said hydride-forming metal at a low pressure of about 5°–50° C. and discharged from each pressure vessel against the back pressure of the gas in the container at a higher temperature of about 30°–150° C.

8. A method of introducing a proportion of hydrogen into a gas pipeline or other pressurized gas container, said method comprising feeding hydrogen into the container from a pressure source lower than the pressure of the gas in the container through a barrier comprising a pressure vessel containing a hydride-forming metal, said barrier being freely permeable to hydrogen but impermeable to the gas in the container, said feeding being continued until the hydrogen partial pressure in the container becomes equal to the hydrogen pressure which is applied to the barrier.

* * * * *